United States Patent [19]

Hennig et al.

[11] 4,198,812
[45] Apr. 22, 1980

[54] POWER SUPPLY CHAIN

[75] Inventors: Kurt Hennig, Munich; Manfred Klein, Ismaning; Albert Stohr, Markt Schwaben, all of Fed. Rep. of Germany

[73] Assignee: Gebr. Hennig GmbH, Ismaning, Fed. Rep. of Germany

[21] Appl. No.: 955,135

[22] Filed: Oct. 26, 1978

[30] Foreign Application Priority Data

Nov. 3, 1977 [DE] Fed. Rep. of Germany ... 7733812[U]
Nov. 3, 1977 [DE] Fed. Rep. of Germany ....... 2749248
May 30, 1978 [DE] Fed. Rep. of Germany ... 7816146[U]

[51] Int. Cl.² ............................................. F16G 13/16
[52] U.S. Cl. ........................................ 59/78.1; 248/51; 248/68 R
[58] Field of Search ................. 59/78.1; 248/49, 51, 248/68 R, 68 CB

[56] References Cited

U.S. PATENT DOCUMENTS

| | | | |
|---|---|---|---|
| 3,382,668 | 5/1968 | Berkes | 248/51 |
| 3,833,776 | 9/1974 | Wampfler | 248/68 CB |
| 3,848,407 | 11/1974 | Moritz | 248/51 |
| 3,856,246 | 12/1974 | Sinko | 248/68 CB |
| 4,018,411 | 4/1977 | Hennig | 248/68 R |
| 4,076,199 | 2/1978 | Paulson | 248/68 R |

FOREIGN PATENT DOCUMENTS

| | | | |
|---|---|---|---|
| 1474230 | 9/1971 | Fed. Rep. of Germany | 59/78.1 |
| 2262018 | 12/1972 | Fed. Rep. of Germany | 248/68 R |
| 2347383 | 4/1975 | Fed. Rep. of Germany | 59/78.1 |
| 2255283 | 6/1975 | Fed. Rep. of Germany | 59/78.1 |
| 344111 | 3/1960 | Switzerland | 248/68 R |

Primary Examiner—Francis S. Husar
Assistant Examiner—Gene P. Crosby
Attorney, Agent, or Firm—Learman & McCulloch

[57] ABSTRACT

A power supply chain having a pair of parallel chain strands spaced by connecting webs provided with cross arms and separators defining openings for the accommodation of power lines. The cross arms, the separators, or both are adjustable to enable the sizes of the openings to be varied to fit power lines of different diameters.

11 Claims, 12 Drawing Figures

FIG. 4
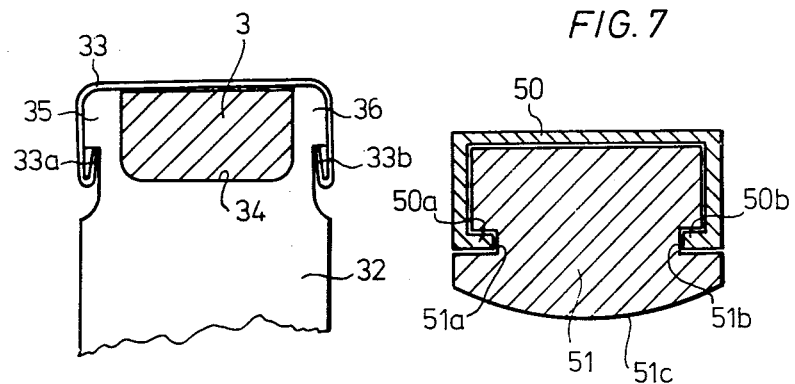
FIG. 7
FIG. 5
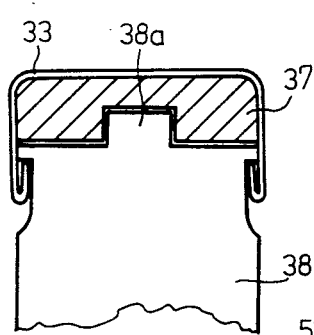
FIG. 8
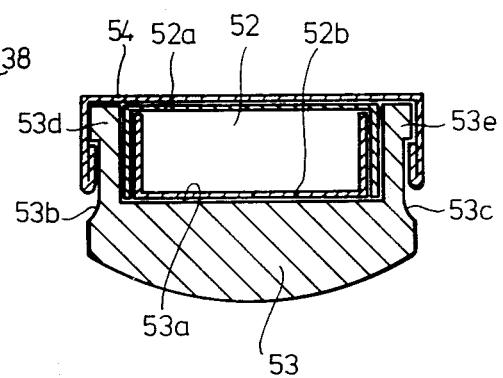

POWER SUPPLY CHAIN

BACKGROUND OF THE INVENTION

This invention relates to a power supply chain consisting of two lateral chain strands and connecting webs arranged in between, each of which comprises two cross arms and separators adjustable in their distance from one another arranged perpendicularly of the cross arms and which accommodate a plurality of power supply lines in the openings formed between the cross arms and the separators.

Power supply lines comprising connecting webs of the type mentioned above are known for example from German Pat. No. 2,255,283 and from German Auslegeschrift No. 2,347,383. Providing the diameter of all the power supply lines supported by the chain substantially corresponds to the interval between the two cross arms of the connecting webs, the power supply lines are reliably held in the openings delimited laterally by the separators and overhead and below by the cross arms.

If, by contrast, the power supply chain is intended to accommodate lines of different diameter, special measures have to be taken to secure these lines of different diameter in the space of each connecting web as delimited by the two cross arms. To this end, it is known (see German Pat. No. 1,474,230) to arrange between the cross arms vertically and horizontally divided, spectacle-like elements which are provided with bores for accommodating the power supply lines. However, the design such as this for a connecting web involves considerable outlay on account of the need to produce and keep in stock different spectacle-like elements with bores of different diameter.

Accordingly, objects of the present invention are to provide a connecting web for a power supply chain of the type mentioned above which does not have any of the disadvantages of known connecting webs, is distinguished by its particularly simple production and assembly, and reliably holds power supply lines of different diameter.

SUMMARY OF THE INVENTION

According to the invention, the foregoing objects are achieved in that bearing elements are provided for supporting the power supply lines in the openings formed by the cross arms and the separators, that surface of these bearing elements which faces the power supply line running parallel to the cross arms and being vertically adjustable.

Accordingly, the invention eliminates the need to use bearing elements having a bore adapted to the particular line diameter. During the tests of the invention it was found that the power supply lines are also reliably held in openings which are delimited laterally by separators and overhead and below by straight bearing elements. Production of the connecting web according to the invention is considerably simplified by the absence of bores in the bearing elements whose production would involve considerable technical outlay.

It is essential to the solution provided by the invention for the distance between the separators on the one hand and the vertical position of those surfaces of the bearing elements which face the power supply lines on the other hand tobe variable. In this way, the upper and lower boundaries may readily be adapted to the particular line diameter. In this way, it is also possible without difficulty to ensure that all the power supply lines provided in the chain, even if they differ in diameter, to lie in the neutral zone of the chain.

DESCRIPTION OF THE DRAWINGS

Advantageous embodiments of the solution provided by the invention are described in detail in the following with reference to the accompanying drawings, wherein:

FIGS. 4 and 6 are partial sections through three embodiments illustrating the connection between the cross-arms and the separators;

FIGS. 7 and 8 are partial sections through two embodiments of the connection between the cross arm and the bearing elements;

Figure 1:
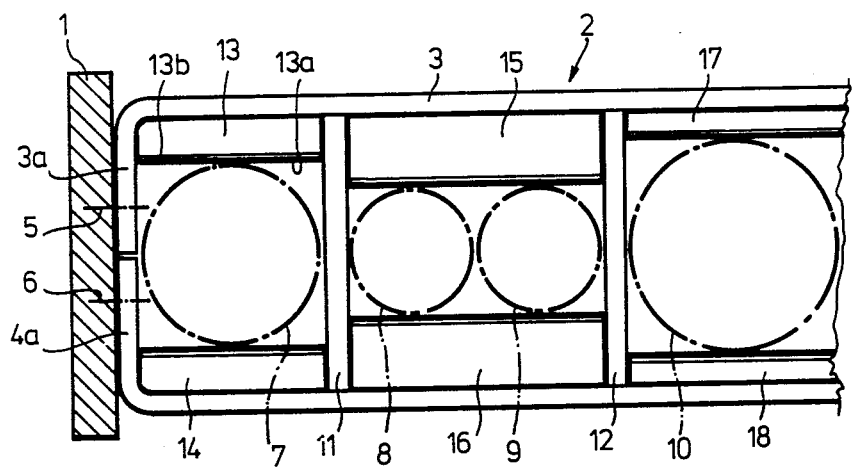
FIG. 1 is a transverse sectional view through part of a first embodiment of the power supply chain according to the invention (viewed in the longitudinal direction of the chain).

The power supply chain shown in a partial view in FIG. 1 comprises two lateral chain strands (of which only the chain strand 1 is shown) and connecting webs 2 arranged at intervals in between. Each of these connecting webs comprises two cross arms 3 and 4 of which the angled ends 3a, 4a are suitably connected (for example by screws 5, 6) to the chain strands (for example 1).

The connecting web 2 is used for holding power supply lines (for example 7 to 10). The openings in the connecting web 2 which are intended to accommodate these lines are laterally delimited by separators (for example 11, 12) which are arranged perpendicularly of the cross arms 3, 4 and which are adjustable in their distance from one another.

The power supply lines are supported in these openings laterally delimited by separators 11, 12 by bearing elements (for example 13 to 18) of which that surface (for example 13a) facing the power supply line (for example 7) runs parallel to the cross arms.

In order to guarantee particularly careful treatment of the power supply lines in the curved zones of the power supply chain, that surface (for example 13a) of the bearing elements (for example 13) which faces the power supply line is best provided with a convex curvature in the longitudinal direction of the chain towards the power supply line (see in FIG. 1 the extension line 13b of this convex curvature of the surface 13a).

The bearing elements 13 to 18 may be held in the connecting web 2 in various ways. If the cross arms 3 and 4 have a U-shaped profile (as indicated in FIG. 5), the bearing elements may engage in these cross arms in form-locking and/or friction-locking manner through projections provided on their upper and lower surfaces. Another possibility is to connect the bearing elements 13 and 18 to the separators 11 and 12 in form-locking manner, for example by means of interengaging projections and recesses.

The bearing elements 13 to 18 used for supporting the power supply lines overhead and below are removable and replaceable with others of different thickness. In this way, it is possible in conjunction with the adjustability of the separators 11 and 12 to adapt the connecting web with a few manipulations to the number and diameter of the particular power supply lines in question.

The nature of the connection between the separators 11, 12 and the cross arms 3, 4 is discussed in more detail hereinafter with reference to FIGS. 4 to 6.

Figure 2:
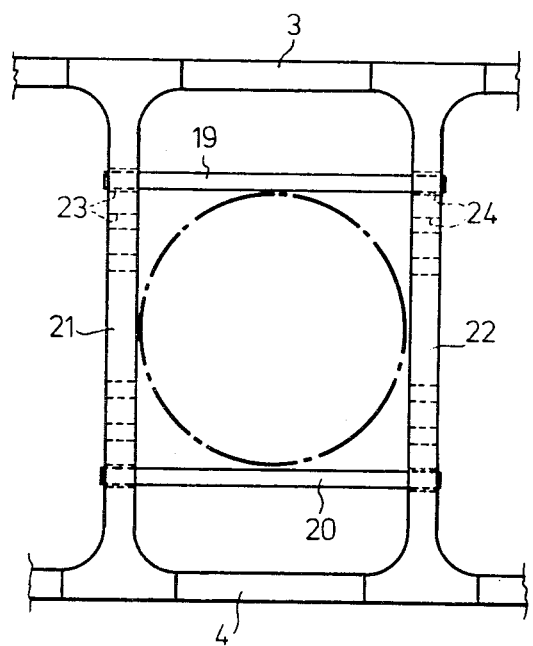
FIGS. 2 and 3 show parts of two further embodiments of the connecting web of the chain.

Whereas, in the embodiment illustrated in FIG. 1, the bearing elements 13 to 18 are formed by components which rest on the cross arms 3, 4, FIG. 2 shows another embodiment in which the bearing elements 19, 20 are removable and vertically adjustable between the cross arms 3, 4. To this end, the separators 21, 22 are provided with holders for vertically supporting the bearing elements 19, 20. In the illustrated embodiment these holders are in the form of openings 23, 24 into which the bearing elements 19, 20 can be inserted. Instead of this, it is also possible for example to design these holders for the bearing elements 19, 20 in the form of projections on the separators 21, 22. The bearing elements 19, 20 are so-called profile elements of which the cross-section may be for example circular (round bars) or rectangular with at least one curved wide side (in which case the curved wide side faces the power supply line).

Figure 3:
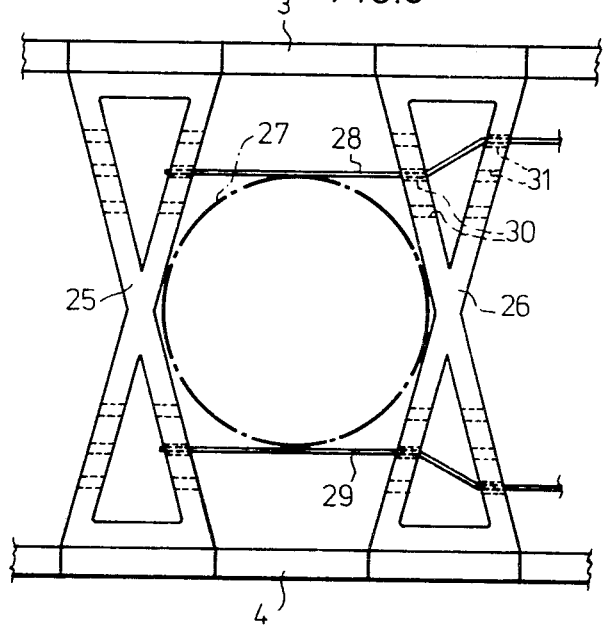

FIG. 3 shows another embodiment of the connecting web according to the invention which differs from the embodiment shown in FIG. 2 above all in two aspects:

In this case, the separators 25, 26 are not constant in width (as measured transversely of the longitudinal axis of the chain). Instead, their width increases continuously from the middle upwards and downwards, i.e. towards the cross arms 3 and 4. As a result, the interval present between the separators 25, 26 tapers upwards and downwards, so that the power supply lines (for example 27) are held in their central position simply by this form of the lateral separators.

In addition, bearing elements 28, 29 are provided. In this embodiment, the removable bearing elements 28, 29 are formed by preferably elastic bands which, in their vertical position adapted to the particular line, are guided through openings (for example 30, 31) in the separators and which preferably extend over the entire width of the connecting web as measured transversely of the longitudinal axis of the chain. These elastic bands 28, 29 may be suitably anchored at the two ends of the connecting web.

The cross arms (for example 3, see FIG. 4) are connected to the separators (for example 32) by U-shaped spring clips 33 which, in the embodiment illustrated in FIG. 4, engage around the end of the separators 32 and are releaseably connected to the separators. In this embodiment, the separators 32 have a downwardly open recess 34 at their upper and/or lowerends the opening of this recess corresponding to the maximum width of the cross arm cross-sectional profile so that the cross arm 3 can be freely introduced into this recess 34.

In this embodiment, the cross arm 3 has the cross section of a rectangle of which the larger wide side (upper side) is flush with the outer edge of the recess 34 and of which the lower wide side is rounded off into the two narrow sides.

The separators 32 are provided with two projections 35, 36 behind which the curved edges 33a, 33b of the spring clips 33 engage.

In the embodiment illustrated in FIG. 5, the cross arm 37 has a substantially U-shaped cross-sectional profile, the sides of the cross sectional profile of the two cross arms belonging to the connecting web being directed towards one another. At their upper and lower ends, the separators (for example 38) carry a projection 38a through which they engage in form-locking manner in the cross-sectional profile of the cross arms. In this case, too, the cross arms 37 and the separators 38 are connected by U-shaped spring clips 33.

Figure 6:
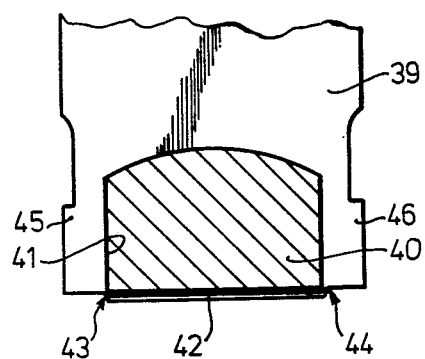

FIG. 6 shows an embodiment of one possible connection between a separator 39 and a lower cross arm 40. To accommodate this cross arm 40, the separator 39 comprises a recess 41 which, initially, is closed off from outside. The wall 42 which closes off this recess 41 in the lower end of the separator 39 from outside is provided with two predetermined breaking points 43, 44 which enable this wall 42 to be subsequently broken open. When this wall 42 is subsequently broken open (for example to replace or shift the separator 39 without having to dismantle the entire connecting web with its lines), the now open recess 41 used to accommodate the cross arm 40 may be closed by a U-shaped spring clip in the manner already described when the separator 39 is reused. To this end, the separator 39 is also provided at its lower end with two projections 45, 46, behind which the curved ends of a U-shaped spring clip of the type in question may engage.

The cross arms may be made for example of extruded metal, the U-shaped spring clips of spring steel and the separators and bearing elements of plastics material.

According to the invention, it is possible to associate separate spring clips with the individual separators for connection with the cross arms. Another possibility is to connect several and preferably all the separators to the cross arm by a common U-shaped spring clip in the form of a rail.

According to the invention, it is also possible for the bearing elements in the embodiment illustrated in FIG. 1 to be held on the cross arms by means of U-shaped spring clips (or by a continuous U-shaped rail).

FIG. 7 shows an embodiment in which the cross arms 50 has the cross section of a U-profile with sides 50a, 50b twice bent inwards through 90°. A bearing element 51 is inserted in form-locking manner into the U-profile of this cross arm 50. This bearing element 51 is provided in particular with two openings 51a, 51b intended to receive the sides 50a, 50b of the cross arm and has a convex curvature on that side 51c which faces the power supply line.

In the embodiment illustrated in FIG. 8, the cross arm 52 consists of two U-shaped cross arm members 52a, 52b which are inserted into one another in form-locking manner with their sides facing one another to form a hollow box profile. This connection between the two chain bands and the cross arm 52 is best established by angle members which are connected to at least one of the two cross arm members 52a, 52b and which preferably engage in the hollow box profile of the cross arm 52.

The bearing element 53 is provided with an opening 53a in which the cross arm is intended to engage and, on its outside, comprises projections 53d, 53e formed by recesses 53b, 53c, behind which a U-shaped spring clip 54 connecting the cross arm 52 and the bearing element 53 engages in the manner already described.

The power supply chain shown as another embodiment in FIGS. 9 to 12 consists essentially of two lateral chain strands (of which only the left-hand chain strand 101 is visible in FIG. 9) and of a plurality of connecting webs 102 arranged in between, each of which comprises two cross arms 103, 103' and separators 104, 105 etc. adjustable in their distance from one another arranged perpendicularly of the cross arms. The power supply lines (for example 107, 108) are accommodated in the openings formed by the cross arms 103, 103' and the separators 104, 105 and also by head members 106, described hereinafter.

Figure 9:
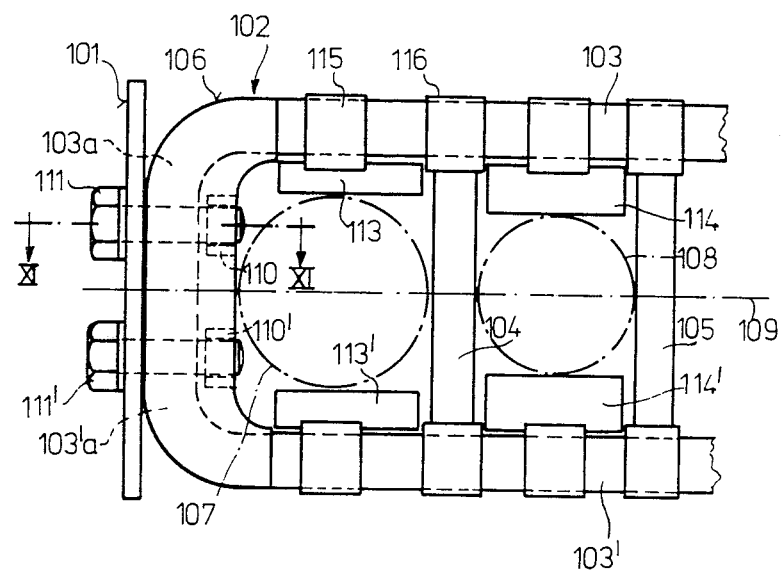
FIG. 9 is a partial front elevation of another embodiment of the power supply chain according to the invention.
Figure 10:
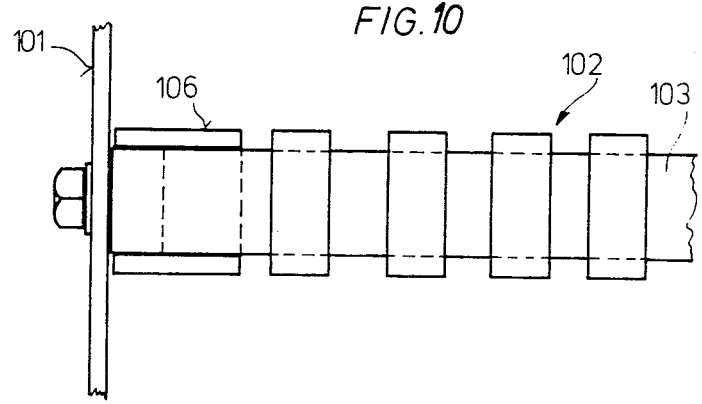
FIG. 10 is a plan view of part of the chain shown in FIG. 9.

The cross arms 103, 103' are connected to each of the two chain strands by a head 106 (for example the head 106 visible in FIG. 9 connects the cross arms 103, 103' to the left-hand chain strand 101). In a central longitudinal plane 109 running parallel to the two cross arms 103, 103', the head 106 has a U-shaped cross-section (see FIG. 11), the open side of the U facing the adjacent chain strand (for example 101).

Figure 11:
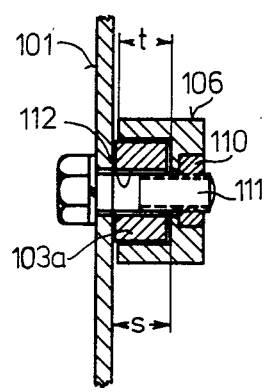
FIG. 11 is a section on the line XI—XI of FIG. 9.
Figure 12:
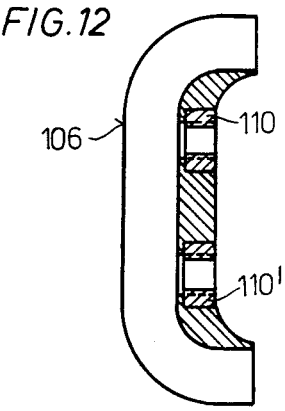
FIG. 12 is a vertical section through a head.

The angled ends 103a, 103'a of the cross arms 103, 103' engage in form-locking manner in the space formed between the head 106 and the chain strand 101 (see FIG. 11). The arrangement is such that the internal depth t of the U-shaped cross-section of the head 106 is somewhat smaller than the thickness s of the angled end (for example 103a) of the cross arm. In this way, the two angled ends of the cross arms may be secured in the space between the head 106 and the chain strand 101.

To this end, the head 106, made for example of a plastics material, is provided with two nuts 110, 110' which are accommodated in recesses and in which engage screws 111, 111'. To this end, the angled ends of the cross arms (for example the end 103a of the cross arm 103) are provided with bores (for example 112) to allow the screws 111, 111' to pass through.

In the illustrated embodiment, the ends 103a, 103'a of the cross arms 103, 103' are angled downward with a transition radius. The head 106 is rounded correspondingly in the transition zone.

The power supply lines (for example 107, 108) are supported in the openings formed by the cross arms and the separators and by the heads by means of bearing elements (for example 113, 113', 114, 114'), of which that surface facing the power supply lines runs parallel to the cross arms and is vertically adjustable. To this end, the bearing elements are preferably replaceable with others of different thickness.

The cross arms 103, 103' are connected to the separators 104, 105 and to the bearing elements 113, 113', 114, 114' by U-shaped spring clips (for example 115, 116) which engage around the cross arms (for example 103) and which are releaseably connected to the separators and to the bearing elements in the manner already described.

If it is desired to remove the cross arm 103, for example to replace individual power supply lines, the screws connecting the cross arm 103 to the two lateral chain strands (for example the screw 111 on the left-hand side) are loosened. In addition, the U-shaped spring clips (for example 116), which connect the cross arm 103 to the separators 104, 105, etc., are shifted along the cross arms 103 to such an extent that their connection to the separators is broken. The cross arm 103 with all the bearing elements (for example 113, 114) depending from it may then be removed upwards, creating free access to the power supply lines. Subsequent replacement of the cross arm and establishment of the connection with the two lateral chain strands and with the separators takes place in an equally simple manner.

Although, in the embodiment illustrated, the head 106 is made of plastics material and the threaded bores are formed by steel nuts held in form-locking manner in recesses formed in the head, it is also possible in accordance with the invention for the head to be made of steel and for the threaded bores to be directly cut into the head.

In order to enable the U-shaped spring clips connecting the cross arms to the separators to be laterally shifted as mentioned above, the width of the spring clips (as measured in the direction of the cross arms) is kept smaller than half the minimal interval between adjacent separators.

It is also possible to provide a common spring clip for one separator and the adjacent bearing element. In that case, the width of the spring clip is best somewhat smaller than that of the bearing element so that, after the spring clip has been shifted, the cross arm is detached from the separator and can be removed together with the bearing element.

We claim:

1. In a power supply chain having two lateral chain strands and connecting webs arranged in between, each of which comprises two cross arms and separators adjustable in their distance from one another arranged perpendicularly of the cross arms and which accommodate a plurality of power supply lines in the openings formed by the cross arms and the separators, the improvement wherein the power supply lines are supported in said openings by removable bearing elements of which that surface which faces the power supply line runs parallel to the cross arms.

2. A power supply chain according to claim 1 wherein that surface of the bearing elements which faces the power supply line has a convex curvature toward the power supply line in the longitudinal direction of the chain.

3. A power supply chain according to claim 1 wherein the bearing elements comprise replaceable members supported by the cross arms.

4. A power supply chain according to claim 1 wherein the bearing elements are supported by the separators.

5. A power supply chain according to claim 1 wherein at least one lower and one upper bearing element is provided in each opening laterally delimited by two separators for accommodating at least one power supply line.

6. A power supply chain according to claim 1 wherein the width of the separators as measured transversely of the longitudinal axis of the chain, increases from the middle upward and downward.

7. A power supply chain according to claim 1 wherein the cross arms are connected to the bearing elements by U-shaped spring clips which engage around the cross arms and the bearing elements and are releasably connected to the separators.

8. A power supply chain according to claim 1 wherein those ends of both cross arms which face the same chain strand engage in a common head which comprises threaded bores and which is connected to such chain strand by threaded fasteners, and wherein, in a central longitudinal plane running parallel to the cross arms, the heads have a U-shaped cross section, the open side of the U facing the adjacent chain strand, and wherein angled ends of the cross arms which are provided with bores for the fasteners engage in form-locking manner in the space formed between the head and the chain strand.

9. A power supply chain according to claim 1 wherein the cross arms are connected to the separators by U-shaped spring clips which engage around the cross arms and the separators and are releasably connected to the separators.

10. A power supply chain according to claim 9 wherein the width of the spring clips as measured in the direction of the cross arms is smaller than half the minimal interval between adjacent separators.

11. A power supply chain according to claim 9 wherein the cross arms have the cross-section of a rectangle of which the larger wide side is flush with the outer edge of a recess provided in the separators.

* * * * *